United States Patent
Ueno et al.

(10) Patent No.: US 7,366,954 B2
(45) Date of Patent: Apr. 29, 2008

(54) DATA TRANSFER DEVICE AND ABNORMAL TRANSFER STATE DETECTING METHOD

(75) Inventors: Hirotaka Ueno, Kasugai (JP); Hirofumi Yamawaki, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 556 days.

(21) Appl. No.: 10/972,380

(22) Filed: Oct. 26, 2004

(65) Prior Publication Data

US 2005/0262404 A1 Nov. 24, 2005

(30) Foreign Application Priority Data

May 18, 2004 (JP) ............................. 2004-148087

(51) Int. Cl.
*G06F 11/00* (2006.01)
(52) U.S. Cl. .......................................... 714/37
(58) Field of Classification Search .................. 714/18, 714/56, 37
See application file for complete search history.

(56) References Cited

U.S. PATENT DOCUMENTS

| | | | | |
|---|---|---|---|---|
| 4,737,957 A | * | 4/1988 | Nohmi et al. ................... | 714/4 |
| 4,845,712 A | * | 7/1989 | Sanner et al. ................ | 714/736 |
| 5,142,526 A | * | 8/1992 | Moriue et al. ............... | 370/245 |
| 5,235,599 A | * | 8/1993 | Nishimura et al. ............. | 714/4 |
| 5,574,865 A | * | 11/1996 | Hashemi ..................... | 710/302 |
| 5,991,900 A | * | 11/1999 | Garnett ........................ | 714/56 |
| 6,023,774 A | * | 2/2000 | Minagawa ..................... | 714/43 |
| 6,286,125 B1 | * | 9/2001 | Leshay et al. .............. | 714/807 |
| 6,483,855 B1 | * | 11/2002 | Minagawa ................... | 370/493 |
| 6,535,783 B1 | * | 3/2003 | Miller et al. ................. | 700/121 |
| 6,917,594 B2 | * | 7/2005 | Feuerstraeter et al. ...... | 370/244 |
| 7,046,722 B2 | * | 5/2006 | Muth .......................... | 375/219 |
| 7,151,746 B2 | * | 12/2006 | Hiroki ......................... | 370/230 |
| 7,197,561 B1 | * | 3/2007 | Lovy et al. .................. | 709/224 |
| 7,231,501 B2 | * | 6/2007 | Azevedo et al. ............ | 711/156 |
| 2002/0138789 A1 | * | 9/2002 | Nishtala ...................... | 714/43 |
| 2003/0067939 A1 | * | 4/2003 | Feuerstraeter et al. ...... | 370/465 |
| 2003/0204768 A1 | * | 10/2003 | Fee ................................ | 714/4 |
| 2004/0255185 A1 | * | 12/2004 | Fujiyama et al. .............. | 714/4 |

FOREIGN PATENT DOCUMENTS

| | | |
|---|---|---|
| JP | H10-224384 | 8/1998 |
| JP | 2000-358040 | 12/2000 |
| JP | 2001-77881 | 3/2001 |
| JP | 2002-300176 | 10/2002 |

OTHER PUBLICATIONS

Newton's Telecom Dictionary, 18th Ed., Newton, Harry, Feb. 2002, CMP Books, pp. 619, 720.*

* cited by examiner

*Primary Examiner*—Christopher McCarthy
(74) *Attorney, Agent, or Firm*—Staas & Halsey LLP

(57) ABSTRACT

A data transfer device comprises a unit for collecting data of a control state by monitoring the control state of a circuit which controls communications protocols within the local device, and a unit for detecting an abnormal state of a data transfer based on the collected state data.

12 Claims, 18 Drawing Sheets

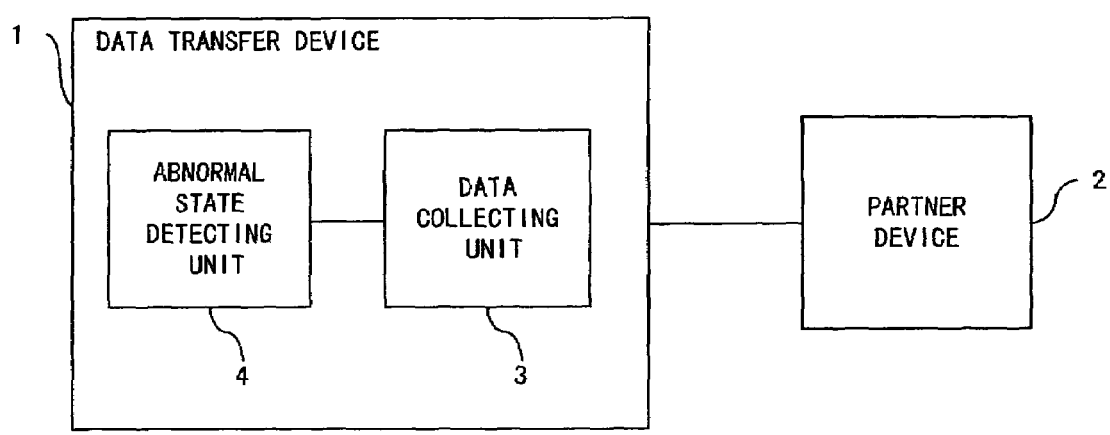
F I G. 1

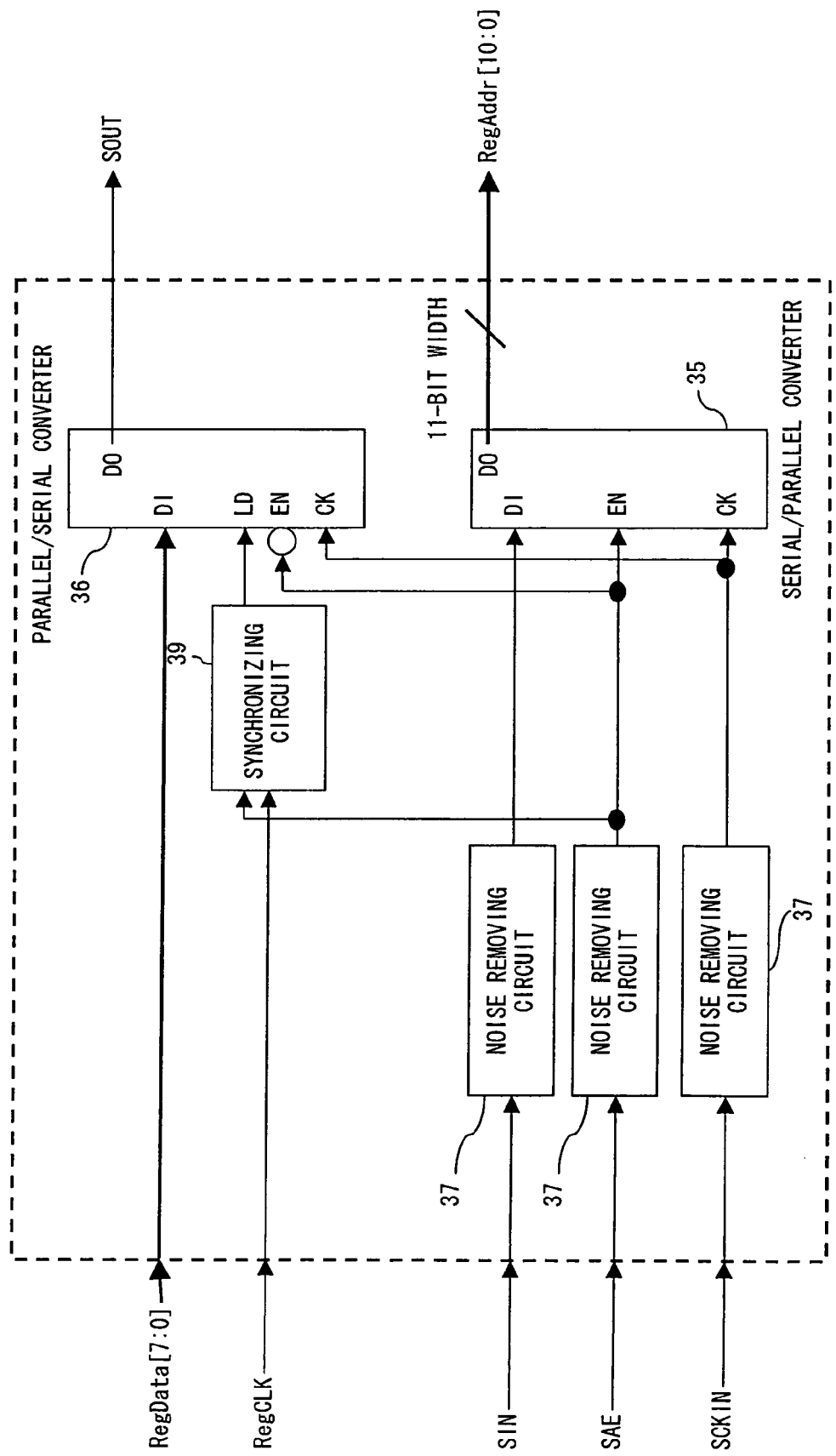
F I G. 5

| RegAdd | RegData[7:0] | | | | | | |
|---|---|---|---|---|---|---|---|
| 0 | Bias | Conne | | | | RX | TX |
| 1 | PORT STATE MACHINE ||||||||
| 2 | STATE MACHINE A ||||||||
| 3 | STATE MACHINE B ||||||||
| 4 | STATE MACHINE C ||||||||
| 5 | | | | | | | |
| 6 | | | | | | | |
| 7 | | | | | | | |

F I G. 7

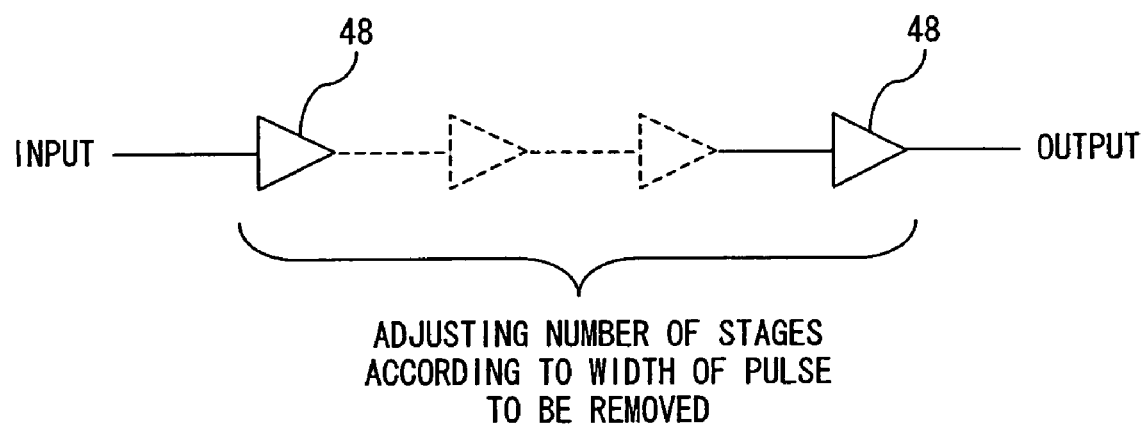
F I G. 1 0

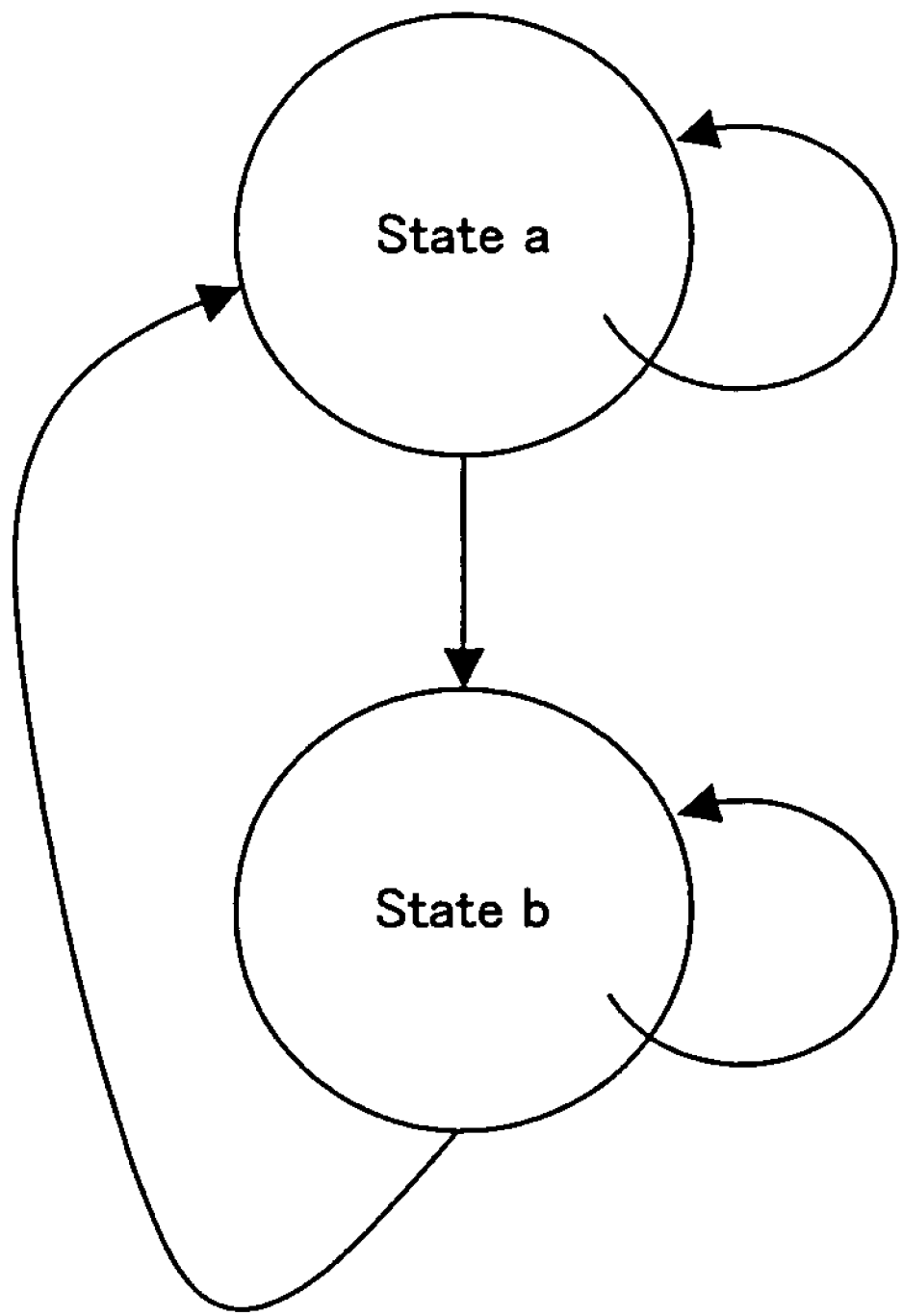
F I G. 1 3

| STATE | State MACHINE A | State MACHINE C | Bias | TX | RX | MEASURE |
|---|---|---|---|---|---|---|
| 0 | Not Complete | Active | — | — | — | HARDWARE RESET |
| 1 | — | — | — | 1 | 1 | BUS RESET |
| 2 | | | | | | HARDWARE RESET |
| 3 | | | | | | PORT DISCONNECTION |
| 4 | | | | | | |
| 5 | | | | | | |
| 6 | | | | | | |
| 7 | | | | | | |

F I G. 1 4

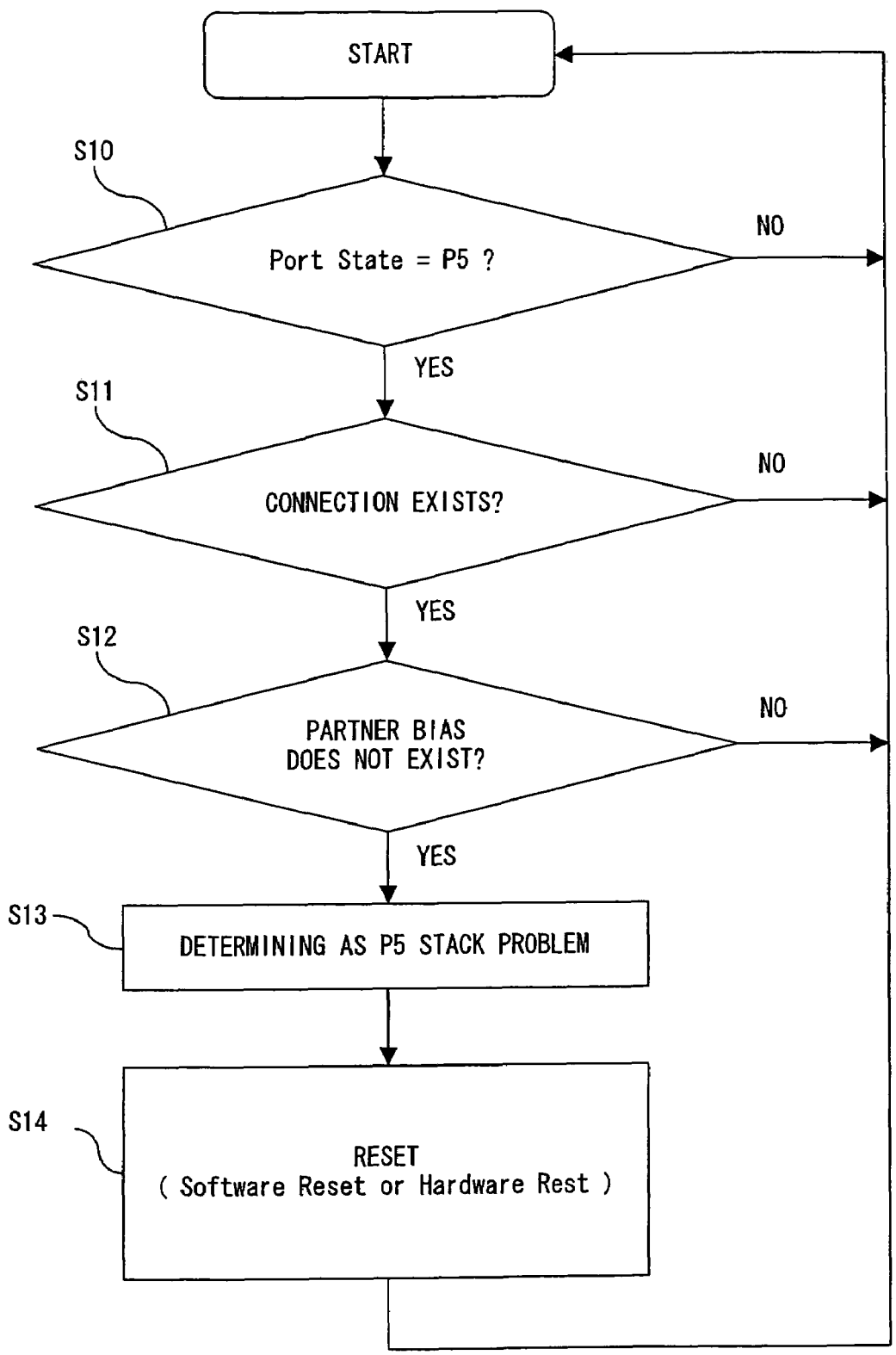
F I G. 1 5

DATA TRANSFER DEVICE AND ABNORMAL TRANSFER STATE DETECTING METHOD

BACKGROUND OF THE INVENTION

1. Field of the Invention

The present invention relates to a data communications system, and more particularly, to a data transfer device that comprises a dedicated interface for detecting a fault, namely, an abnormal state, detects the abnormal state, and can take a necessary measure when the fault occurs in the inside of the device, a partner device, a bus, etc., for example, in a system where a plurality of appliances are connected by a digital bus, and to a method detecting such an abnormal state in a data transfer.

2. Description of the Related Art

If data is transferred or shared between information processing devices, the data is passed between the information processing devices. In this case, the data passing is implemented by adopting some interface.

For example, in a field of personal computers, interface standards such as IEEE1394, USB, Advanced Technology Attachment (ATA) which is an interface for connecting a hard disk etc., Peripheral Component Interconnect (PCI) as a standard of a bus of a personal computer etc. are adopted, and a mutual communication is implemented based on a standard between devices which conform to each standard.

Generally, in a communications system, a local device is also expected to be used under an ill environment such as a high temperature, noise, etc. even if a partner device stably operates. As a matter of course, a reverse case occurs. As performance required in a communications system, stable operations of a device are important in addition to a transfer rate, transfer efficiency, etc. Especially, for a device which transfers important data, and a device used under a harsh condition, the necessity for stable operations is high.

For safety, fault detection, etc. in such a communications system, the following conventional techniques exist.

[Patent Document 1]

Japanese Patent Publication No. HEI10-224384 "Digital Bus Fault Detecting Device"

[Patent Document 2]

Japanese Patent Publication No. 2000-358040 "Communications Network and Communications Device"

[Patent Document 3]

Japanese Patent Publication No. 2001-77881 "Packet Communications Network System"

[Patent Document 4]

Japanese Patent Publication No. 2002-300176 "Data Communications Device, Data Communications Method, Program of a Data Communications Method, and Storage Medium Recording the Program of the Data Communications Method"

Patent Document 1 discloses a fault detecting device that can easily recognize a fault of a digital bus by reading a picture signal or a control signal transmitted via a digital bus, by detecting the existence/non-existence of data from the read signal, and by lighting up an LED if the data does not exist.

Patent Document 2 discloses a communications device that comprises a switch unit disconnecting a link between nodes, and quickly forms a route bypassing a location of a fault if a node which cannot maintain a proper connection relationship exists.

Patent Document 3 discloses a network system that can automatically restore from an abnormal state without disconnecting a communication by detecting reset request data from a base station, and by making a reset, for example, if the abnormal state of a mobile terminal is detected.

Patent Document 4 discloses a technique for a stable data communication, which executes a process for a logical connection with a bus by detecting a logical disconnection from the bus even when disturbance noise caused by static electricity, etc. mixes.

However, such conventional techniques have a problem that automatically restoring a data transfer system when the system performs a misoperation is difficult in many cases. Especially, in a communication where complex protocols are required in a high-speed operation, a misoperation is sometimes caused by an external factor such as noise mixture, an instantaneous voltage drop, etc., etc., the communication is halted, and restoration becomes difficult.

Also when standardized communications protocols such as IEEE1394 and USB, there arises a problem that an unexpected state occurs depending on an operation of a communications device on the side of a connection partner, and a communication cannot be made. Although a data transfer between the partner device and a local device must be guaranteed in such a universal bus, also a problem of compatibility between connecting appliances occurs in reality.

With the IEEE1394 standard, a bus reset can be automatically made to attempt restoration in correspondence with an occurring situation. However, its execution conditions are restrictive and not sufficient. Additionally, in a situation where a bus reset often occurs, data transfer efficiency significantly deteriorates.

Furthermore, with the IEEE1394 standard, a read of a register within a protocol controller which controls communications protocols can be made with a standard interface in order to detect a fault. However, if such an operation is performed, data reception or an interrupt display as a normal operation is hindered. Besides, if a circuit which configures the standard interface function stacks, also a register read cannot be made.

SUMMARY OF THE INVENTION

An object of the present invention is to automatically restore from an abnormal state, and to enable a stable communication by providing a dedicated interface for monitoring the control state of a circuit which controls communications protocols, and by allowing the abnormal state to be detected with data collected by the dedicated interface, and to be restored, in view of the above described problems.

In the present invention, a data transfer device, which makes a data transfer between a communication partner device and the local device, comprises at least a data collecting unit and an abnormal state detecting unit.

The data collecting unit is an interface controlling unit comprised, for example, within a protocol controller IC, and intended to collect data of a control state by monitoring the control state of a circuit which controls communications protocols within the local device.

The abnormal state detecting unit is configured by an interface controlling unit and a determination circuit unit, for example, within a control IC, and intended to detect an abnormal state of the local device based on state data collected by the data collecting unit.

In the present invention, a program used by a computer, which detects an abnormal state of a data transfer, causes the computer to execute a process, the process comprising: collecting data of a control state by monitoring the control state of a circuit which controls communications protocols within a local device; and detecting an abnormal state of a data transfer based on the state data. Additionally, a computer-readable portable storage medium recording this program is used.

A data transfer abnormal state detecting method according to the present invention comprises: collecting data of a control state by monitoring the control state of a circuit which controls communications protocols within a local device, and detecting an abnormal state of a data transfer based on the state data.

As described above, in the present invention, an abnormal state of a data transfer is detected with a monitor of state data, for example, within a protocol controller IC, and a coping method corresponding to the detected abnormal state is executed.

According to the present invention, a dedicated interface for detecting an abnormal state of a data transfer is comprised, and detection of an abnormal state and a coping method corresponding to the detected state are executed, whereby a data transfer can be stably made without hindering the operations of a standard interface corresponding to a communication standard. This greatly contributes to improvements in the practicability of a data transfer device.

BRIEF DESCRIPTION OF THE DRAWINGS

FIG. 1 is a block diagram showing the principle of a configuration of a data transferring system according to the present invention;

FIG. 5 is a block diagram showing the details of a configuration of a serial interface controlling unit shown in FIG. 4;

FIG. 7 explains a display map of a mapping block shown in FIG. 4;

FIG. 10 exemplifies another configuration of the noise removing circuit shown in FIG. 5;

FIG. 13 shows a state transition of a state machine C related to the process shown in FIG. 11;

FIG. 14 exemplifies contents stored in a state determination table used in the process shown in FIG. 11;

FIG. 15 is a flowchart showing a process in an implementation example 2;

DESCRIPTION OF THE PREFERRED EMBODIMENTS

Figure 2:
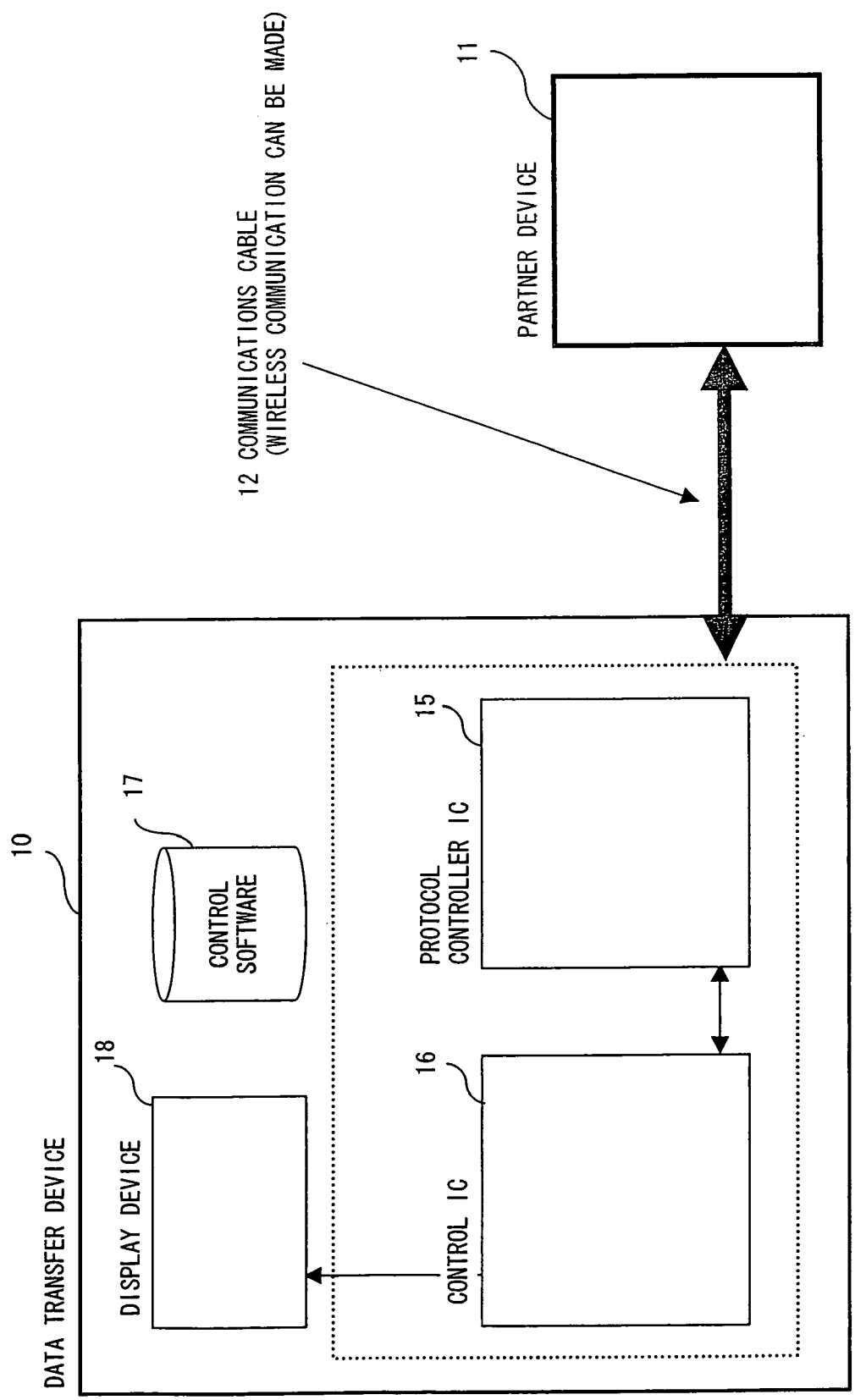
FIG. 2 is a block diagram showing a configuration of a data transfer device according to a preferred embodiment.

FIG. 1 is a block diagram showing the principle of a configuration of a data transferring system according to the present invention. In this figure, a data transfer device 1 makes a data transfer between a communication partner device 2 and the local device, and comprises at least a data collecting unit 3 and an abnormal state detecting unit 4.

The data collecting unit 3 is an interface controlling unit comprised, for example, within a protocol controller IC, and intended to collect data of a control state by monitoring the control state of a circuit which controls communications protocols within the local device.

The abnormal state detecting unit 4 is configured by an interface controlling unit and a determination circuit unit, for example, within a control IC, and intended to detect an abnormal state of the local device based on the state data collected by the data collecting unit 3.

In the present invention, a state data storing unit storing the data collected by the data collecting unit 3, for example, a mapping block can be comprised, the state data storing unit can provide the abnormal state detecting unit 4 with the state data of an address specified in the state data storing unit 4 in correspondence with the specification of the address from the abnormal state detecting unit, and the data collecting unit can comprise a noise removing unit removing a noise component from an input signal of the address specification, for example, a noise removing circuit.

Additionally, in the present invention, the abnormal state detecting unit 4 can comprise a coping method storing unit storing a method coping with an abnormal state corresponding to the data collected by the data collecting unit 3, for example, a state determination table.

A software unit performing a control for the determination of the coping method for an abnormal state, and the execution of the coping method can be further comprised. Or, a restoration attempting unit sequentially making a restoration attempt according to prepared restoration attempting procedures when the abnormal state is detected by the abnormal state detecting unit 4, for example, control software or a program stored in a database can be comprised.

A communication disconnecting unit disconnecting a communication with the partner device if an abnormal state is not resolved after all of the restoration attempting procedures are executed by the restoration attempting unit can be further comprised. Besides, a disconnection state notifying unit externally notifying the communication disconnection state, for example, a display device can be further comprised.

Still further, in the present invention, the data collecting unit 3 and the abnormal state detecting unit 4 can be respectively comprised by different semiconductor integrated circuits or by one semiconductor integrated circuit.

Still further, in the present invention, a program used by a computer, which detects an abnormal state of a data transfer, causes the computer to execute a process, the process comprising: collecting data of a control state by monitoring the control state of a circuit which controls communications protocols within a local device, and detecting an abnormal state of a data transfer based on the state data. Besides, a computer-readable portable storage medium recording this program is used.

Still further, as a data transfer abnormal state detecting method according to the present invention, a method collecting data of a control state by monitoring the control state of a circuit which controls communications protocols within a local device, and detecting an abnormal state of a data transfer based on the state data is used.

In this method, the abnormal state can be detected based on contents of a register which stores the collected data, or detected by reading the contents of the register based on a signal, which specifies the address of this register and from which noise is removed, or a coping method for the abnormal state can be determined by referencing a table which stores a coping method for the abnormal state in correspondence with the collected data when the abnormal state is detected.

As described above, according to the present invention, an abnormal state of a data transfer is detected with a monitor of state data, for example, of an LSI which controls communications protocols, and a coping method corresponding to the abnormal state is executed, whereby a stable communication can be made. Causes of an abnormal state, namely, a communication fault are diverse. A coping method corresponding to an abnormal state is executed to resume a communication except for a case where the abnormal state cannot be resolved according to a condition such as a mismatch of an electric characteristic, a fault, noise, a temperature, etc.

FIG. 2 is a block diagram showing an entire configuration of the data transferring system where the abnormal state detecting method of the data transfer device according to the present invention is used. In this figure, the data transfer device 10 targeted by the present invention is connected with a partner device 11, for example, with a communications cable 12. As a matter of course, this connection may be made wirelessly.

The data transfer device 10 comprises a protocol controller IC 15 controlling communications protocols, a control IC 16 for controlling the whole of the data transfer device 10, control software 17, and a display device 18.

In this preferred embodiment, a portion collecting data of a control state by monitoring the control state of a circuit which controls communications protocols, a portion detecting an abnormal state of the device based on the state data and taking measures depending on need are separately comprised within the protocol controller IC 15 and the control IC 16. However, as indicated by a dotted line, the protocol controller IC 15 and the control IC 16 are configured by one IC, whereby the portion collecting data, and the portion detecting an abnormal state and taking measures against the detected abnormal state can be comprised within one IC, as a matter of course.

Figure 3:
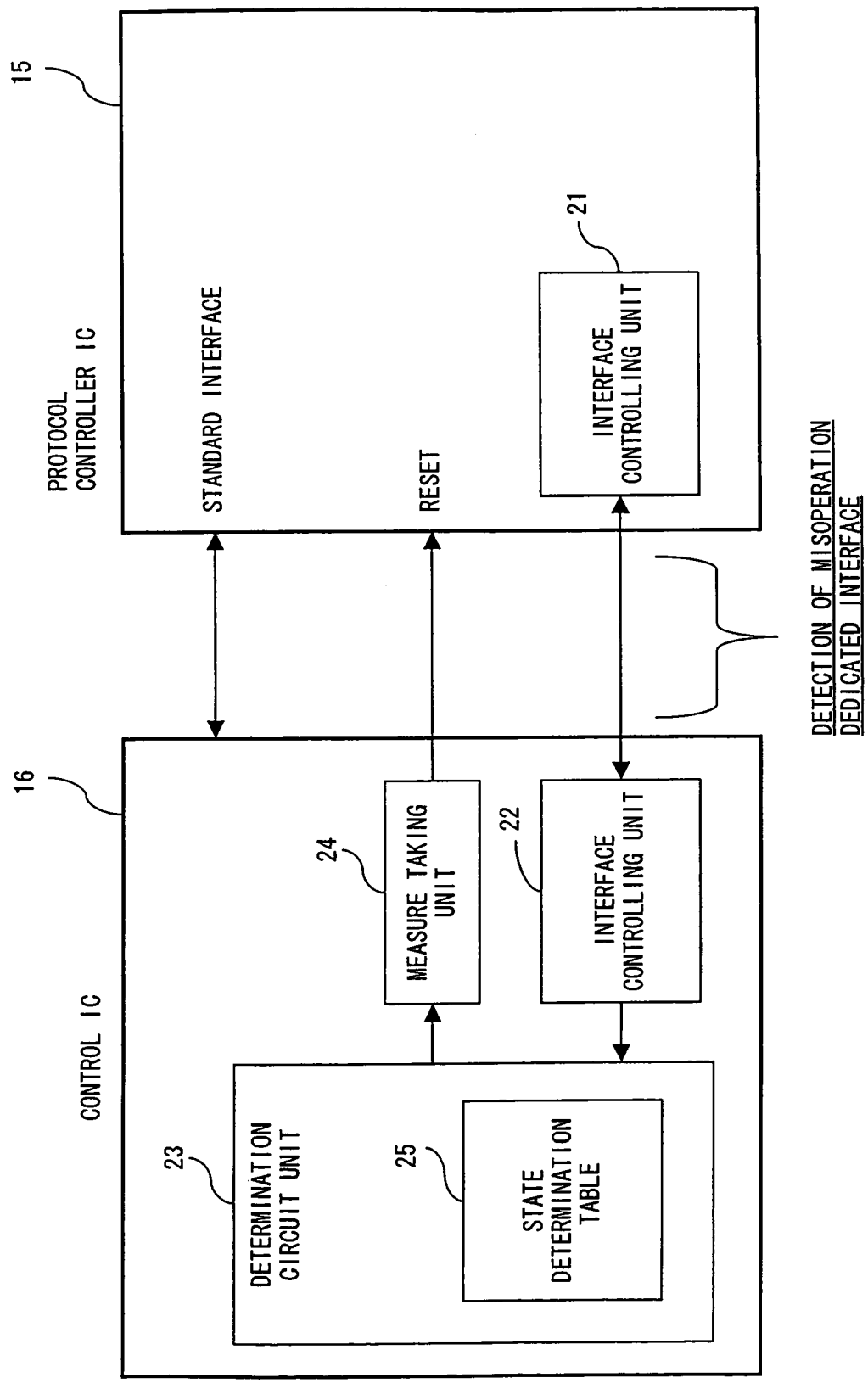
FIG. 3 is a block diagram showing configurations of a protocol controller IC and a control IC, which are shown in FIG. 2.

FIG. 3 explains configurations of the protocol controller IC 15 and the control IC 16, which are shown in FIG. 2, and a connection relationship between the protocol controller IC 15 and the control IC 16. In this figure, the protocol controller IC 15 comprises an interface controlling unit 21 for collecting data of a control state by monitoring the control state of a circuit which controls communications protocols, and the like, for example, in addition to a standard interface, for example, of an IEEE1394 bus.

The control IC 16 comprises an interface controlling unit 22 which is connected to the interface controlling unit 21 on the side of the protocol controller IC 15, and together configures an interface dedicated to the detection of a misoperation, a determination circuit unit 23 determining an abnormal state of the local device based on data output from the interface controlling unit 22, and a measure taking unit 24 taking a measure against the abnormal state in correspondence with the output of the determination circuit unit 23. As will be described later, the measure taking unit 24, for example, resets the protocol controller IC 15 depending on need. The determination circuit unit 23 comprises a state determination table 25 for determining the type of an abnormal state, etc. in correspondence with data provided from the interface controlling unit 22, namely, data of a control state.

Figure 4:
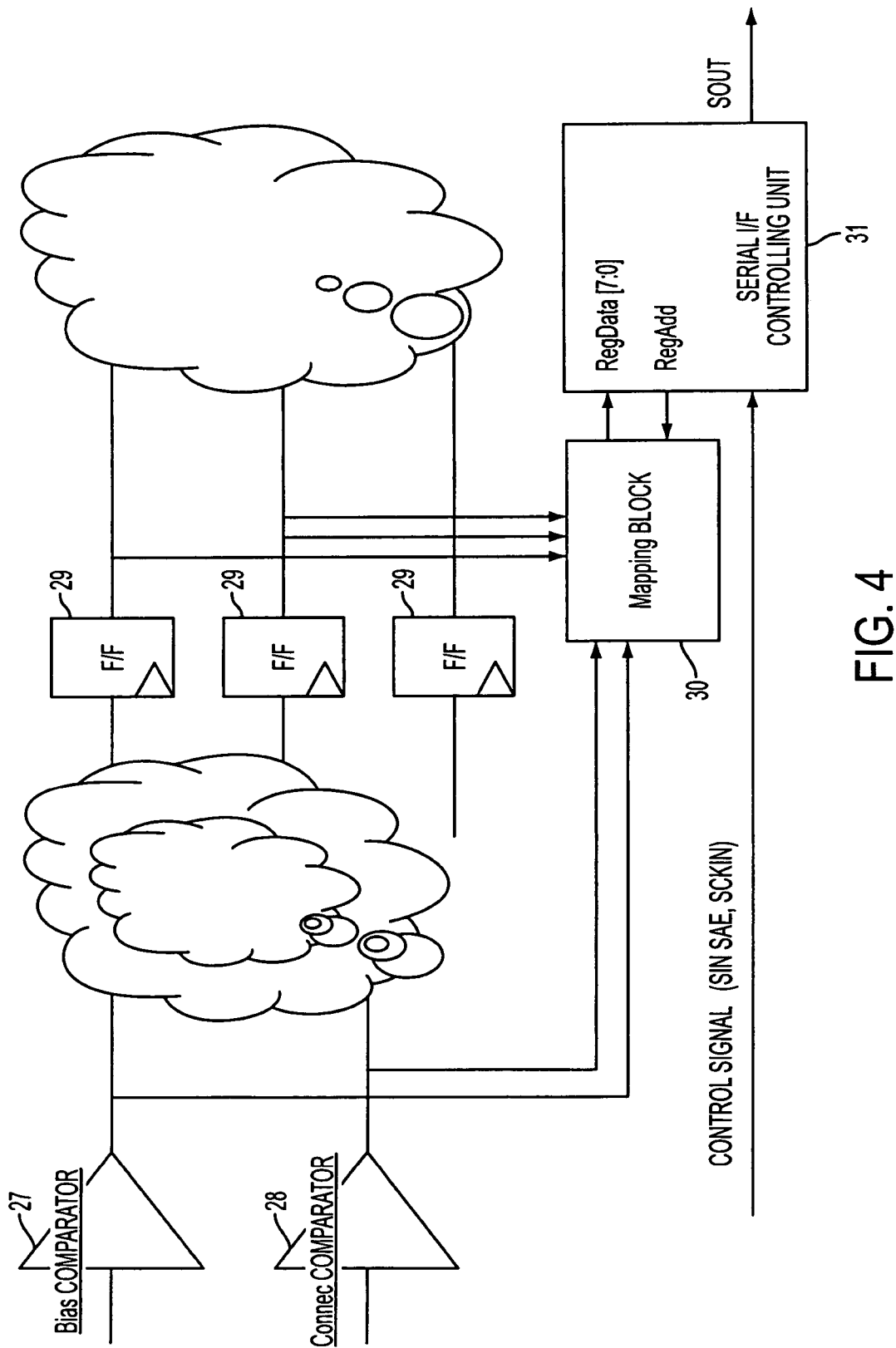
FIG. 4 explains a monitor circuit which collects state data within the protocol controller IC.

FIG. 4 shows a configuration of a monitor circuit which includes a mapping block 30 collecting state data within the protocol controller IC 15, and a serial I/F controlling unit 31. In this figure, the mapping block 30 and the serial I/F controlling unit 31 correspond to the interface controlling unit 21 shown in FIG. 3

In the monitor circuit shown in FIG. 4, various types of control state data are collected in the mapping block 30 from a Bias comparator 27 for detecting a bias signal, for example, from the side of the partner device 11 shown in FIG. 2, a Connect comparator 28 for detecting a state of a connection (connect signal) with the side of the partner device 11, circuit elements 29 such as an F/F group configuring a state machine which corresponds to various types of state transition machines, and the like as will be described later.

The serial I/F controlling unit 31 reads the data of the mapping block 30 in correspondence with the input of a control signal from the interface controlling unit 22 within the control IC 16 shown in FIG. 3, and returns the read data to the interface controlling unit 22.

FIG. 5 shows the details of the configuration of the serial I/F controlling unit 31. From the side of the interface controlling unit 22 within the control IC 16, a clock signal SCKIN, a signal SIN which provides the register address of a display map in the mapping block 30, and an address enable signal SAE which indicates that the signal SIN is an address are provided to the serial I/F controlling unit 31 as control signals.

In FIG. 5, the serial I/F controlling unit 31 is configured by noise removing circuits 37 removing noise from the input clock signal SCKIN and the input signals SIN and SAE, a serial/parallel converter 35 providing the mapping block 30 with a register address having an 11-bit width in correspondence with a signal resultant from noise removal, a parallel/serial converter 36 converting 8-bit register data read from the mapping block 30 into a serial signal and returning the converted signal to the interface controlling unit 22 of the control IC 16 as a signal SOUT, and a synchronizing circuit 39 synchronizing RegCLK, which is a clock on the side of the protocol controller IC 15 and is not synchronized with the clock SCKIN provided from the side of the control IC 16, with the address enable signal SAE, and provides a data load terminal (LD) of the parallel/serial converter 36 with the synchronized signal.

Figure 6:
FIG. 6 is a timing chart explaining the operations of the circuit shown in FIG. 5.

FIG. 6 is a timing chart showing the operations of the serial I/F controlling unit shown in FIG. 5. In this figure, an 11-bit register address for the mapping block 30 as the input signal SIN is sequentially provided in synchronization with, for example, a falling edge of the input clock SCKIN in an H section of SAE as the control signal. The 11-bit address is converted into a register address having an 11-bit width by the serial/parallel converter 35, and provided to the mapping block 30.

In a latter half of the timing chart shown in FIG. 6, 8-bit register data is read from the mapping block 30, and converted into a serial signal by the parallel/serial converter 36. Then, the signal is output in units of 1 bit as the signal SOUT to the interface controlling unit 22 on the side of the control IC 16 in synchronization with, for example, a rising edge of the clock signal SCKIN. At this time, in the loading of the parallel signal to the parallel/serial converter 36, the address enable signal SAE among the control signals is synchronized with RegCLK by the synchronizing circuit 39, and provided to the data load terminal LD of the converter 36, whereby the data is captured.

FIG. 7 shows a specific example of a map as the contents of the mapping block 30 shown in FIG. 4. In this figure, 8-bit register data is stored in correspondence with 0 to 7, actually, an 11-bit register address. Here, a flag which represents the state of the above described Bias signal or Connect signal, a flag which indicates whether a state is either a reception state (RX) or a transmission state (TX), and the like are stored at a register address 0, and data corresponding to various types of state machines to be described later are stored at and after a register address 1.

Figure 8:
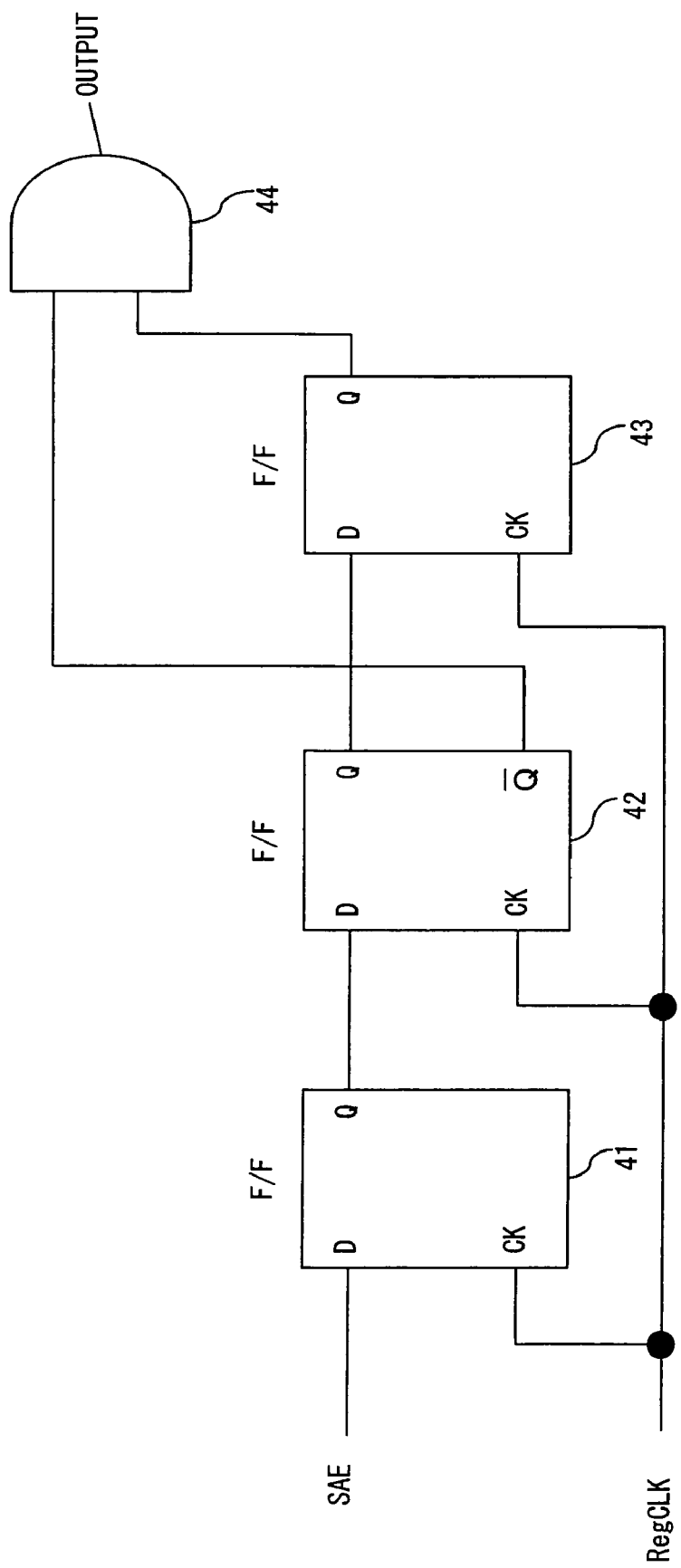
FIG. 8 shows the details of a configuration of a synchronizing circuit shown in FIG. 5.

FIG. 8 shows the details of the configuration of the synchronizing circuit 39 shown in FIG. 5. In this figure, the synchronizing circuit 39 is configured by D flip-flops 41, 42, and 43 in 3 stages, and an AND gate 44. In this figure, the falling edge of the address enable signal (SAE), which is one of the control signals output from the interface controlling unit 22 within the control IC 16 shown in FIG. 3, is detected, for example, at the rising edge of the register clock (Reg-CLK) by the data flip-flop 41 in the first stage, and a Not Q (Q bar in this figure) output of the data flip-flop 42 in the second stage becomes H after 1 clock. Additionally, at this time point, the Q output of the data flip-flop 43 in the third stage becomes H, and the output of the AND gate 44 becomes H as a result. Then, an input to the data load terminal LD of the parallel/serial converter 36 shown in FIG. 5 becomes H, and register data as 8-bit parallel data provided to a data input (DI) terminal is captured by the parallel/serial converter 36.

Figure 9:
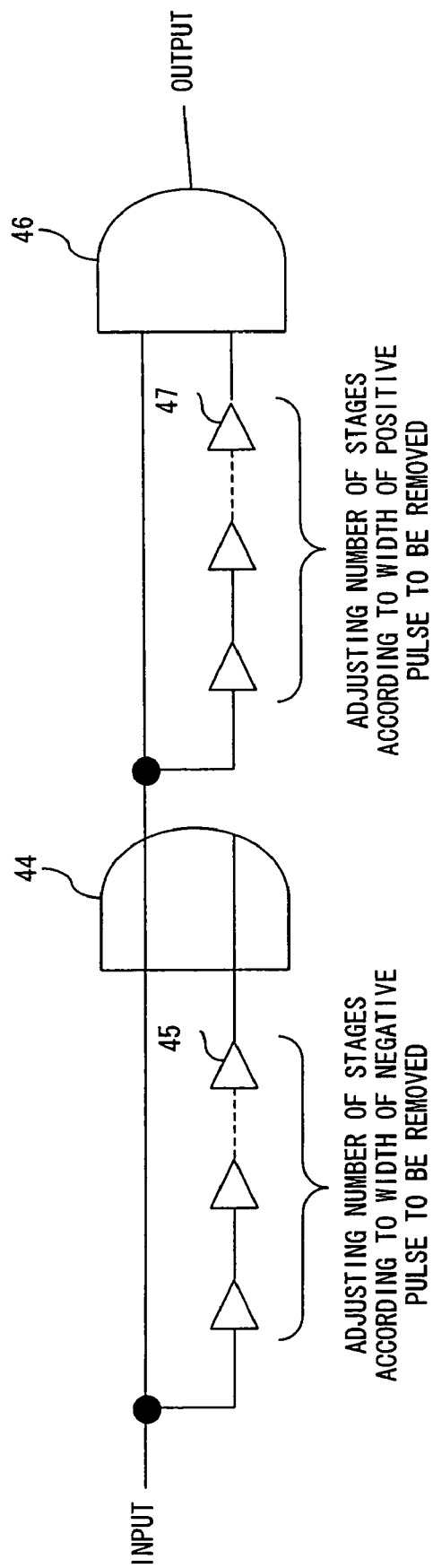
FIG. 9 exemplifies a configuration of a noise removing circuit shown in FIG. 5.

FIGS. 9 and 10 show configurations of the noise removing circuit shown in FIG. 5. FIG. 9 shows the configuration of the noise removing circuit 37 removing noise from an input signal. This noise removing circuit 37 removes pulses in positive and negative directions as noise, which exert an influence on the rising edge of the input clock SCKIN, from the clock signal SCKIN, because especially, SOUT as the output signal of the parallel/serial converter 36 shown in FIG. 5, namely, respective pieces of 8-bit data output after the signal SAE becomes L in FIG. 6 are output in synchronization with the rising edge of the clock SCKIN.

Namely, an input signal is provided to one of inputs of an OR gate 44 directly. In the meantime, a plurality of stages of delay elements 45 are connected to the other input of the OR gate 44, and the input signal is also provided via the plurality of stages of delay elements, whereby a pulse in the negative direction, which has a pulse width shorter than a predetermined time period, is removed from the output of the OR gate 44. Similarly, to one of inputs of an AND gate 46, the output signal of the OR gate 44 is provided unchanged. In the meantime, a pulse in the positive direction, which has a pulse width shorter than a predetermined time period, is removed from the output of the AND gate 46, because a plurality of stages of delay elements 47 are connected to the other input terminal. The numbers of stages of the delay elements 45 and 47 are adjusted according to the width of a pulse to be removed.

FIG. 10 exemplifies another configuration of the noise removing circuit 37. In this figure, an input signal is output via a plurality of stages of delay elements 48, whereby bipolar pulses having a pulse width shorter than a predetermined time period, namely, pulses in positive and negative directions are removed. If the delay elements 48 are ideal delay elements, the output signal is only delayed by a predetermined time period from the input signal. However, the input signal passes through the actual delay elements 48, so that its rising and falling speeds become low, and its waveform is distorted. Therefore, the pulse nature is almost removed after passing through the plurality of delay elements 48, and the level of the input signal slightly varies. As a result, an influence as noise is removed.

In this preferred embodiment, the state of a fault (abnormal state) is determined by using data transmitted from the side of the protocol controller IC 15 according to the contents of the state determination table 25 shown in FIG. 3 as described above. A process for this determination, and a process for determining a measure against the state of a fault are described as an implementation example 1 with reference to FIGS. 11 to 14.

Figure 11:
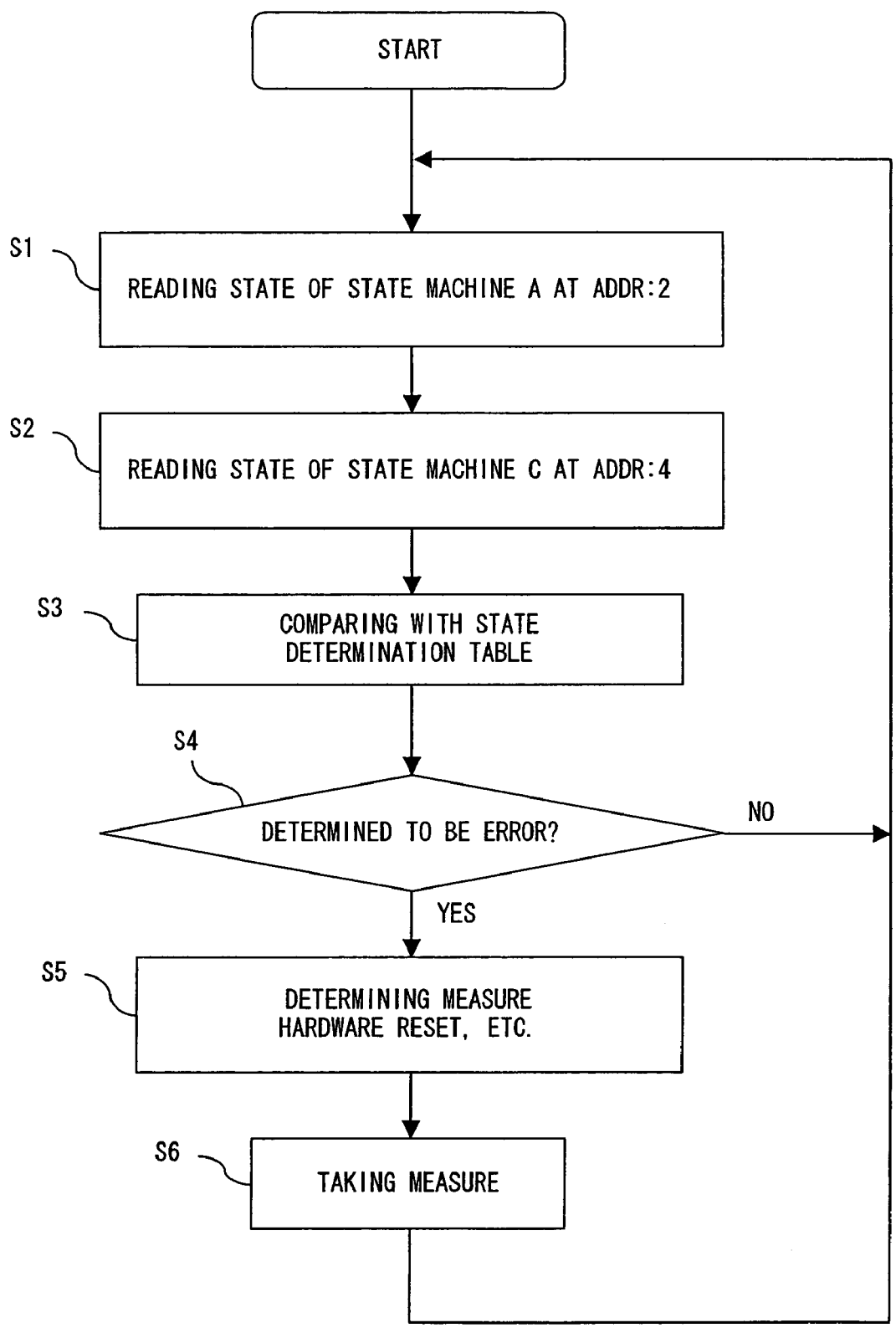
FIG. 11 is a flowchart showing a process executed in an implementation example 1.

FIG. 11 is a flowchart showing the process for detecting a fault (abnormal state) in the implementation example 1. In the implementation example 1, contents of register data are first read from a display map within the mapping block, which is explained with reference to FIG. 7, in correspondence with a register address, and the process for detecting a fault is executed. Firstly, data of a state machine A at an address 2 is read in step S1. Then, data of a state machine C at an address 4 is read in step S2.

Figure 12:
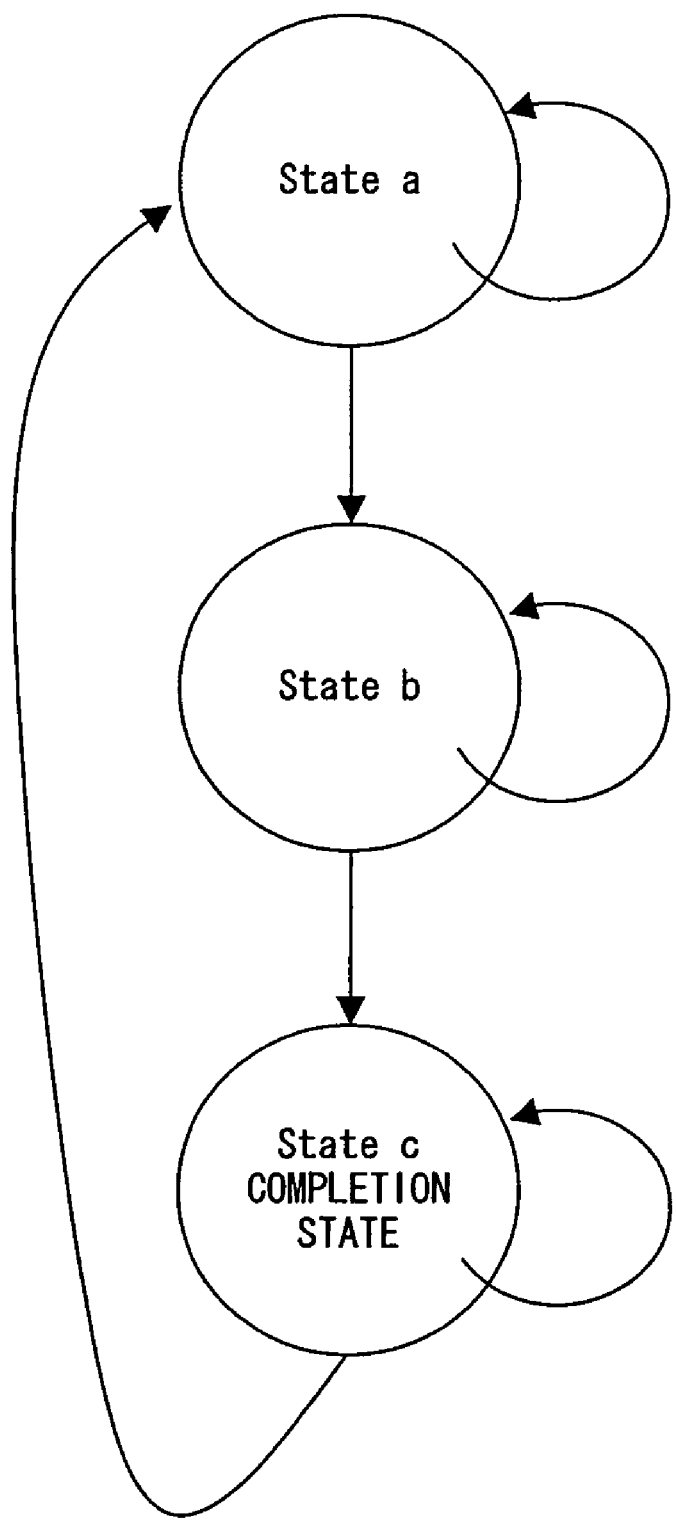
FIG. 12 shows a state transition of a state machine A related to the process shown in FIG. 11.

FIGS. 12 and 13 explain state transitions in the state machines A and C. In the state machine A, a state transition is made from a state a to a state b to a state c as shown in FIG. 12. The state c indicates a completion state.

In the state machine C shown in FIG. 13, a state transition is fundamentally made in an order of a state a, a state b, the state a, the state b, . . . . Assuming that the state machine C is defined to operate after the state machine A enters a completion state, namely, the state machine A reaches the state c as a relationship with the state machine A shown in FIG. 12, an abnormal state is determined to occur if the state machine C operates when the state machine A is not in the completion state.

FIG. 14 exemplifies contents stored in the state determination table 25 comprised by the determination circuit unit 23 of the control IC 16 shown in FIG. 3 in order to detect such an abnormal state. The first entry in the table shown in this figure indicates, as a state 0, that a state where the state machine C is in an operation state (Active) when the state machine A is not in a completion state (not Complete) is an abnormal state, and a hardware reset must be made as a measure against that state.

In step S3 of FIG. 11, contents of the read data are compared with the state determination table 25. In step S5, a measure such as a hardware reset, etc. is determined if the contents of the data are determined to be an error, namely, a fault in step S4. In step S6, the determined measure is taken, and the process goes back to step S1 in which the state data is monitored. Also if the contents of the read data are not determined to be an error according to the contents of the state determination table, the process goes back to step S1, in which the state data is monitored. Here, also in the case where the contents of the data are not determined to be an error according to the contents of the state determination table 25, determining the state to be a completely normal state cannot be always made, as a matter of course.

Here, an abnormal state is detected with a combination of states in the state machine A shown in FIG. 12 and the state machine C shown in FIG. 13. For example, if a state machine of a physical link interface is reception and a state machine which manages an IEEE1394 bus is transmission in a combination of states of state machines as a similar method, this will be a combination of states, which cannot be implemented in design, this is determined to be, for example, a stack of a physical link standard interface. As a result, a reset is made.

FIG. 15 is a flowchart showing a process executed in an implementation example 2 as a fault detection process corresponding to a P5 stack problem in a port state machine of the IEEE1394 standard. This fault is a fault state where a device on a partner side cannot be mutually recognized when a cable is plugged in/out. This leads to a situation where a bias voltage on a partner side cannot be mutually detected, and a communication cannot be made although the cable is connected. FIG. 15 is a flowchart showing the process for detecting the P5 stack problem.

Once the process is started in FIG. 15, it is first determined in step S10 whether or not the state of the port state machine is a P5 state. If the state is the P5 state, it is determined in step S11 whether or not a connection with a partner device exists, for example, in correspondence with the output of the comparator 28 shown in FIG. 4. If the connection exists, it is determined in step S12 whether or not a bias voltage from the partner device exists according to the output of the Bias comparator 27 shown in FIG. 4. If the bias voltage does not exist, it is determined in step S13 that the problem is the P5 stack problem. Then, in step S14, a reset (software or hardware reset) is made as a measure, and the process goes back to the start. Also if the result of the determination made in step 10, S11, or S12 is "No", the process goes back to the start.

Figure 16:
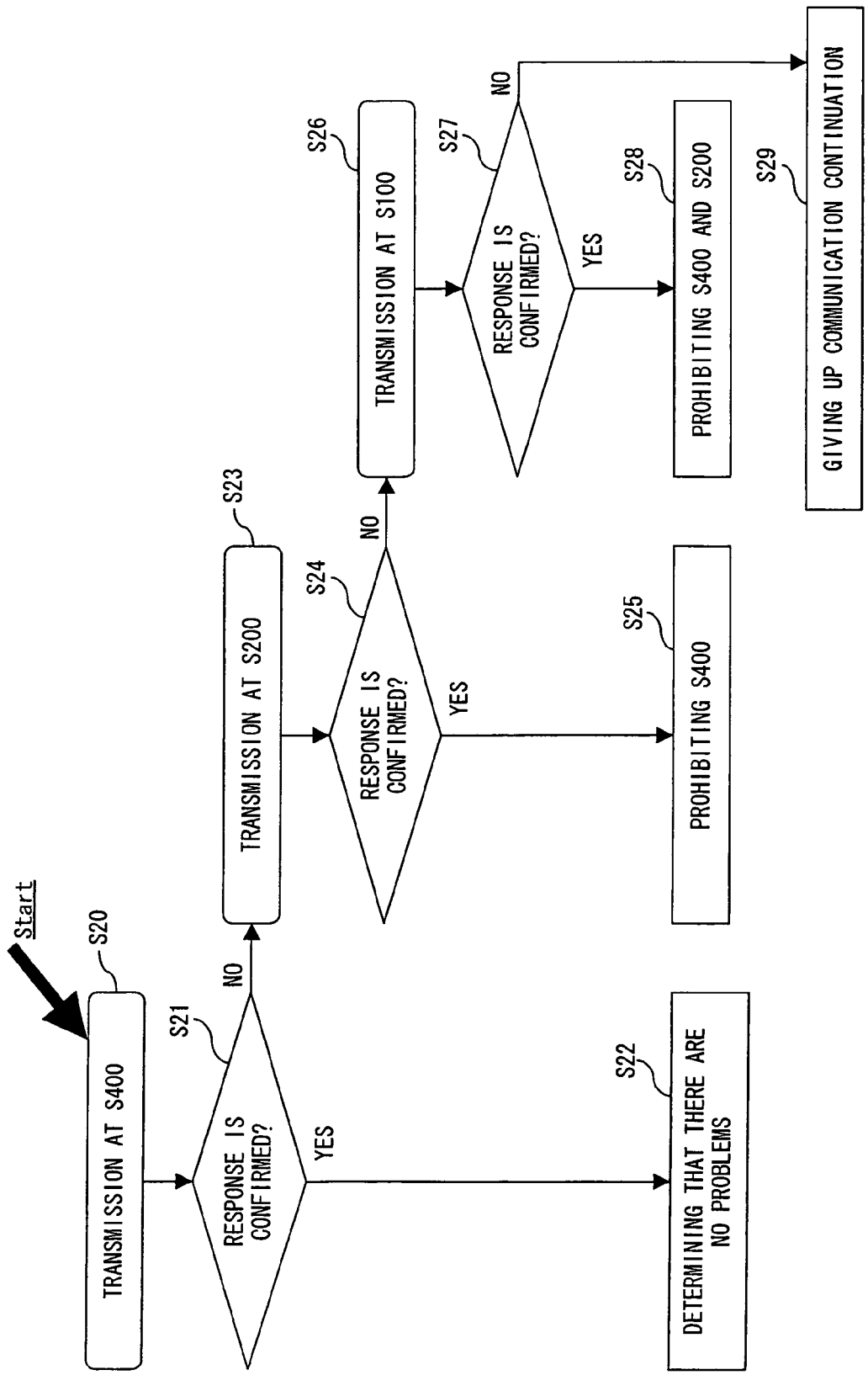
FIG. 16 is a flowchart showing a process executed in an implementation example 3.

This preferred embodiment assumes that a restoration attempt is sequentially made according to prepared restoration attempting procedures when a fault (abnormal) state is detected. FIG. 16 is a flowchart showing a process for reducing a communication speed as the restoration attempting procedures as an implementation example 3. If a communication is hindered by an external factor such as a data degradation caused by the use of an inferior cable, erroneous detection of a communication speed signal, an influence of noise, a lack in the accuracy of PLL, etc., there is a great possibility that a similar fault occurs even if restoration is made with a reset. Changing a condition such as a communication speed, etc. is suitable for improving such a situation. For example, if a packet as a response to a packet transmitted to the side of a partner device cannot be received, there is a possibility that the problem is resolved by repeating the restoration attempt according to the procedures of the flowchart shown in FIG. 16. As packets which require a response from a partner side, a ping packet, a remote access packet, a read request packet, etc. of the IEEE1394 standard exist.

Once the process is started in FIG. 16, a packet is first transmitted at a transfer rate of S400, namely, 400 MHz in step S20. Then, a response is confirmed in step S21. If a proper response is obtained, it is determined in step S22 that there are no problems.

If the response is not confirmed in step S21, a packet is transmitted at a transfer rate of S200, namely, 200 MHz. Then, in step S24, the response is confirmed. If the response is properly confirmed, a packet transfer at S400 is prohibited in step S25.

If the response cannot be properly confirmed in step S24, a packet is transmitted at a transfer rate of S100, namely, 100 MHz in step S26. In step S27, a response is confirmed. If the response is properly confirmed, packet transfers at S400 and at S200 are prohibited in step S28. If the response cannot be confirmed in step S27, a communication continuation is given up in step S29.

A communication continuation is given up in step S27 of FIG. 16 if the response cannot be confirmed in step S27 of FIG. 16. In such a case, the control IC 16 shown in FIG. 3 halts the operations of the protocol controller IC 15 within the local device by turning off a power supply or by making a continuous reset.

Figure 17:
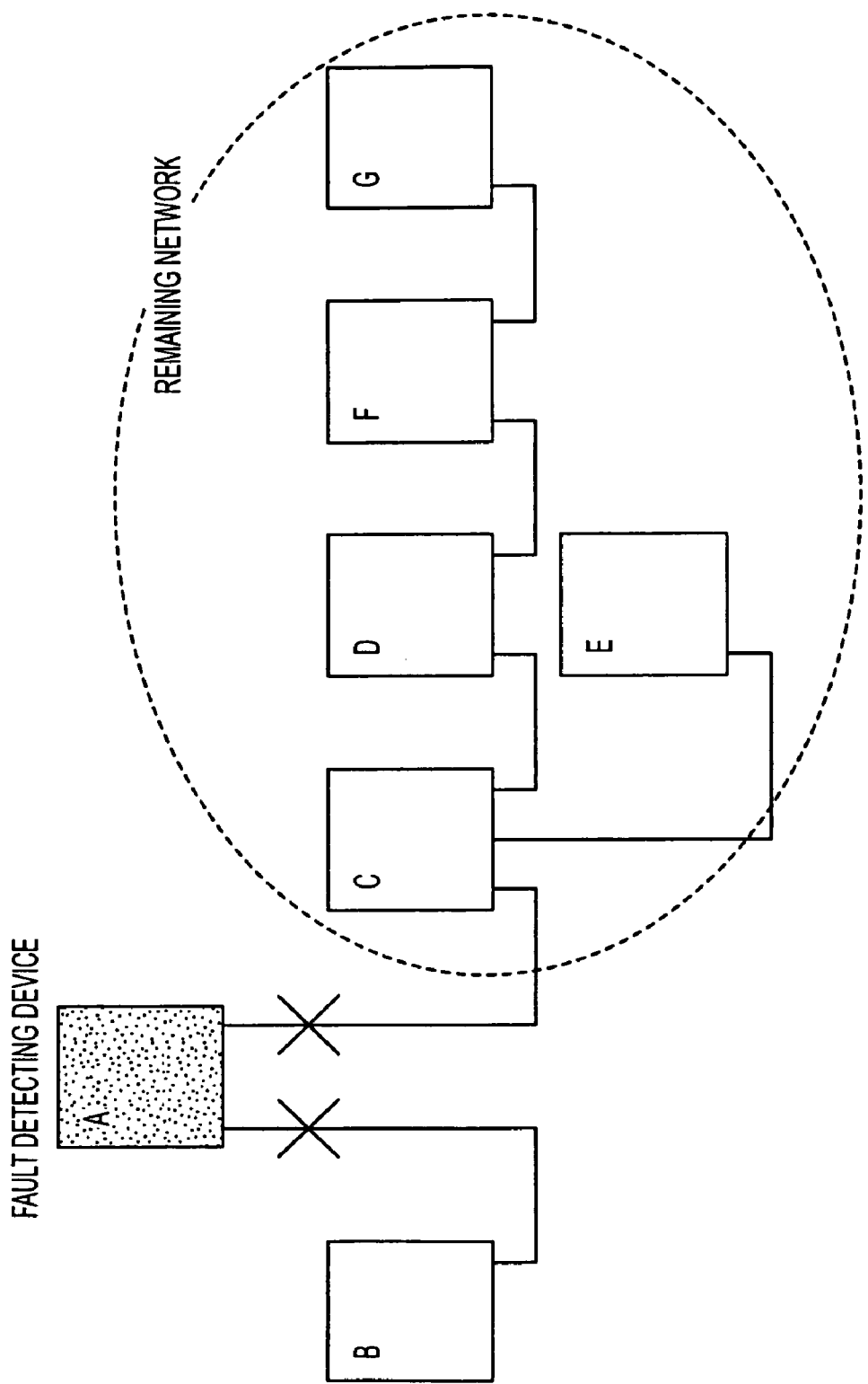
FIG. 17 explains a disconnection of a network in an implementation example 4.

FIG. 17 explains an implementation example 4 where a data transfer device which cannot exit from an abnormal state as described above disconnects the local device from a network. With the IEEE1394 standard, a plurality of data transfer devices can be connected to a bus. However, a data transfer device which cannot exit from an abnormal state can possibly hinder an entire communication. By disconnecting a local device from the network, a communication among other data transfer devices remaining in the network can be restored.

In FIG. 17, a data transfer device A which cannot exit from the abnormal state disconnects the local device from the network, whereby a proper communication is resumed by a network where data transfer devices remaining in the network, namely, the network where the devices C, D, E, F, and G are connected.

In such a case, the control IC 16 in the device A generates an alarm for a user or a higher-order system, whereby, for example, the user is urged to take a further measure. As such an alarm, an LED display, a message display on the display device 18 shown in FIG. 2, etc. can be made. The user can resume the use of the device A, for example, by replacing a cable, by inspecting the other devices, or by taking a noise measure or a temperature measure, etc.

As described above, according to the present invention, a device can be restored by detecting an external factor such as noise, etc., or a communication fault such as a problem of an individual communications device, and a communication can be stably continued. If an abnormal state is not resolved not due to a temporary fault caused by noise, etc. but due to a failure in a partner device, etc. a port from which the abnormal state is detected can be also invalidated. In such a case, a communications device where the abnormal state occurs is eliminated from a network, whereby a communication among remaining devices can be also restored.

For example, if a communications device is used in an environment where the device is exposed to noise at high temperature, such as in the periphery of an engine of an automobile, there is a concern that a communication is disrupted. However, a measure can be taken by a communications system itself. Also if a logical problem occurs, for example, under a logical condition, namely, a stack is caused by a bug, recovery can be made.

As a future issue, cause identification and measure taking can be also considered at a firmware level by internally endowing a suitable monitor function, even if a hardware measure is required for a problem which occurs between an unknown connection partner and a local device.

Figure 18:
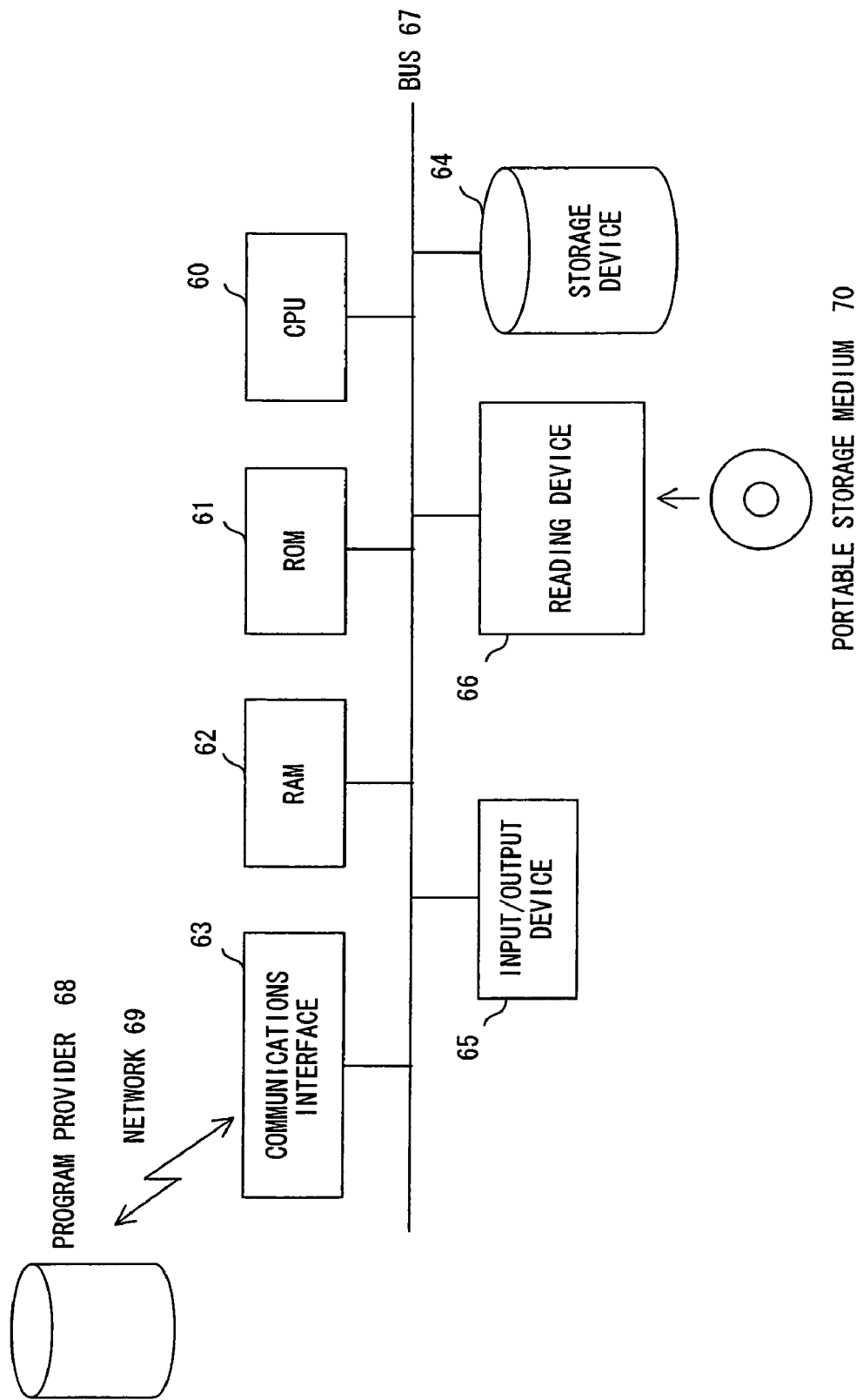
FIG. 18 explains the loading of a program for implementing the present invention into a computer.

Up to this point, the data transfer device and the transfer abnormal state detecting method according to the present invention are described in detail. This data transfer device can be naturally configured by using a general computer as its fundamental element. FIG. 18 is a block diagram showing the configuration of such a computer, namely, a hardware environment.

In FIG. 18, the computer system is configured by a central processing unit (CPU) 60, a read-only memory (ROM) 61, a random access memory (RAM) 62, a communications interface 63, a storage device 64, an input/output device 65, a portable storage medium reading device 66, and a bus 67 to which all of the above described constituent elements are connected.

As the storage device 64, storage devices in various forms such as a hard disk, a magnetic disk, etc. can be used. The programs represented by the flowcharts shown in FIGS. 11, 15, 16, etc., a program according to claim 9 of the present invention, and the like are stored in such a storage device 64 or onto a ROM 61, and the programs are executed by the CPU 60, whereby fault detection of the data transfer device itself, detection of an abnormal state of a data transfer between a partner device and the device, etc. can be made.

Such programs can be stored, for example, in the storage device 64 from a program provider 68 via a network 69 and a communications interface 63. Or, the programs can be stored onto a marketed and distributed portable storage medium 70, set in the reading device 66, and executed by the CPU 60. As the portable storage medium 70, storage media in various forms such as a CD-ROM, a flexible disk, an optical disk, a magneto-optical disk, a DVD, etc. can be used. The programs stored onto such a storage medium are read by the reading device 66, whereby the fault detection of the data transfer device, and the like according to the preferred embodiment can be made.

What is claimed is:

1. A data transfer device for a data transfer between a communication partner device and the device, comprising:
    a data collecting unit for collecting data of a control state by monitoring the control state of a circuit which controls communications protocols within the device; and
    an abnormal state detecting unit for detecting an abnormal state of a data transfer based on the collected state data, and
    wherein said data collecting unit comprises
        a state data storing unit for storing the collected data; and
        said data collecting unit provides said abnormal state detecting unit with state data of an address specified in said state data storing unit in correspondence with an input of address specified by said abnormal state detecting unit.

2. The data transfer device according to claim 1, wherein said abnormal state detecting unit comprises a coping method storing unit for storing a coping method for an abnormal state in correspondence with the data collected by said data collecting unit.

3. The data transfer device according to claim 2, further comprising
    a software unit for performing a control for a determination of the coping method for the abnormal state, and execution of the coping method.

4. The data transfer device according to claim 1, further comprising
    a restoration attempting unit for sequentially making a restoration attempt according to prepared restoration attempting procedures when the abnormal state is detected by said abnormal state detecting unit.

5. The data transfer device according to claim 4, further comprising
    a communication disconnecting unit for disconnecting a communication with the partner device if the abnormal state is not resolved after all of the restoration attempting procedures are executed by said restoration attempting unit.

6. The data transfer device according to claim 5, further comprising
    a disconnection state notifying unit for externally notifying a state of a communication disconnection from the communication partner device.

7. The data transfer device according to claim 1, wherein said data collecting unit and said abnormal state detecting unit are respectively allocated to different semiconductor integrated circuits.

8. A data transfer device for a data transfer between a communication partner device and the device, comprising:
    a data collecting unit for collecting data of a control state by monitoring the control state of a circuit which controls communications protocols within the device; and
    an abnormal state detecting unit for detecting an abnormal state of a data transfer based on the collected state data, and, wherein:
    said data collecting unit provides said abnormal state detecting unit with state data of an address specified in said state data storing unit in correspondence with an input of address specification from said abnormal state detecting unit; and
    said data collecting unit further comprises a noise removing unit for removing a noise component from an input signal of the address specification.

9. A computer-readable portable storage medium on which is recorded a program for causing a computer, which detects an abnormal state of a data transfer within a device making a data transfer between a communication partner device and the device, to execute a process, the process comprising:
    collecting data of a control state by monitoring the control state of a circuit which controls communications protocols within the device; and
    detecting an abnormal state of a data transfer based on the state data, and
    wherein
        the abnormal state is detected based on contents of a register which stores the collected date in detection of the abnormal state; and
        the contents of the register are read based on a signal which specifies an address of the register.

10. A method detecting an abnormal state of a data transfer made between a communication partner device and a device, comprising:
    collecting data of a control state by monitoring the control state of a circuit which controls communications protocols within the local device; and
    detecting an abnormal state of a data transfer based on the collected state data, wherein
        the abnormal state is detected based on contents of a register which stores the collected data in detection of the abnormal state; and
        the contents of the register are read based on a signal which specifies an address of the register.

11. The method detecting an abnormal state of a data transfer according to claim 10, wherein a coping method for the abnormal state is determined by referencing a table which stores a coping method for the abnormal state in correspondence with the collected data, when the abnormal state is detected.

12. A method detecting an abnormal state of a data transfer made between a communication partner device and a device, comprising:

collecting data of a control state by monitoring the control state of a circuit which controls communications protocols within the local device; and detecting an abnormal state of a data transfer based on the collected state data, and wherein the contents of the register are read based on a noise of the signal which specifies an address of the register and from which noise is removed, and the abnormal state is detected in the detection of the abnormal state.

* * * * *